No. 893,918.  
PATENTED JULY 21, 1908.  
W. F. GOSSICK & A. R. VAN VALKENBURGH.  
THERMOSTAT.  
APPLICATION FILED JULY 18, 1907.
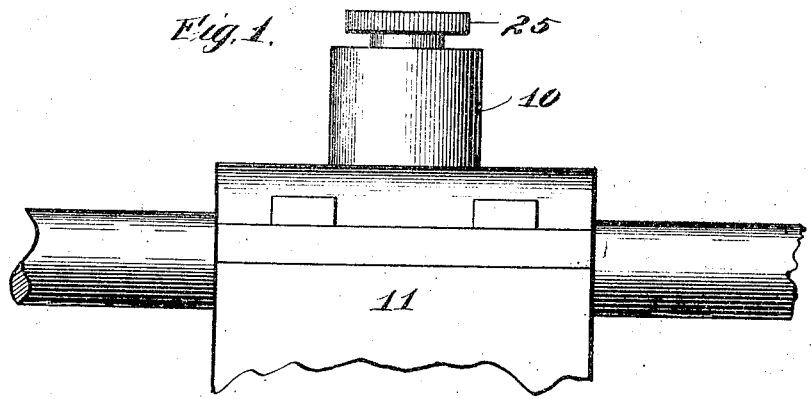
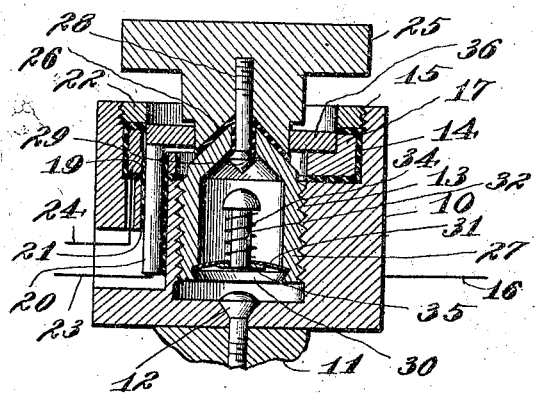
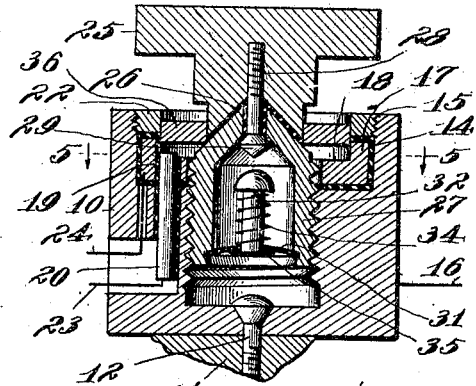
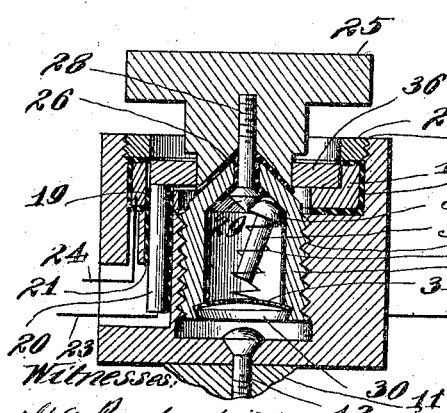
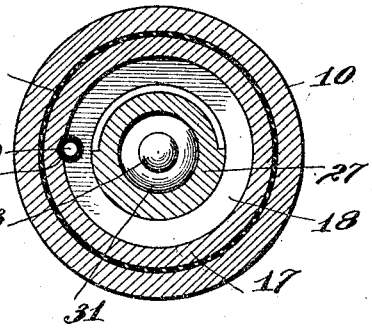

UNITED STATES PATENT OFFICE.

WILLIAM F. GOSSICK AND ARTHUR R. VAN VALKENBURGH, OF CHICAGO, ILLINOIS.

THERMOSTAT.

No. 893,918.  Specification of Letters Patent.  Patented July 21, 1908.

Application filed July 18, 1907. Serial No. 384,360.

*To all whom it may concern:*

Be it known that we, WILLIAM F. GOSSICK and ARTHUR R. VAN VALKENBURGH, citizens of the United States, residing at Chicago, in the county of Cook and State of Illinois, have invented certain new and useful Improvements in Thermostats, of which the following is a specification.

Our invention pertains to improvements in electrical thermostats which permit of their use in conjunction with an annunciating or alarm system which will indicate or sound an alarm if the removable element or plug of the thermostat is displaced from its normal operative position in its socket.

Our improved device is intended primarily, though not exclusively, for use with shaft bearings to announce or indicate an undue heating of the bearing such as is usually called a "hot box". Systems and thermostats have heretofore been used which would ring a bell or operate some other kind of an alarm when any one of a number of bearings became heated, and it is possible in such systems to test the wires to determine whether or not they are in operative and working condition. It is impossible, however, with such systems and thermostats or heat-operated devices to test so as to determine whether or not the thermostats are in their proper places on the bearings. To overcome this difficulty we have provided our new and improved form of device, and with this style of thermostat and system as soon as any one of the plugs of the thermostats is unscrewed from its socket an alarm is sounded and the test circuit is rendered inoperative. Consequently, with our thermostats the efficiency and reliability of the protective system is rendered doubly valuable, since by their use one is reliably informed by testing not only that the wires of the system are unbroken, but also that the thermostats are in proper relation with their bearings so as to be released or operated by the heat developed therein under abnormal conditions.

Our new form of thermostat we have illustrated in detail on the accompanying drawing forming a part of this specification.

On said drawing Figure 1 is an elevation of a bearing and its shaft equipped with one of our thermostats; Fig. 2 is a central vertical section through the thermostat illustrating the plug screwed home and in operative relation with the bearing so that the heat-responsive device will be released if the bearing becomes unduly heated; Fig. 3 is a view similar to Fig. 2 showing the relation of the parts after the thermostat has been actuated by the heat of the bearing; Fig. 4 is a view similar to Fig. 2 showing the plug which contains the heat-responsive device or thermostat partly removed from its coöperating socket; and Fig. 5 is a horizontal cross-section on line 5, 5 of Fig. 4.

Our improved and novel thermostat comprises an electrical conducting socket 10 adapted to be fastened to a shaft bearing or box 11 by means of a screw 12 passing through a hole or aperture through the lower part of the socket. At its center the socket 10 has a screw-threaded recess 13, and in its upper portion a somewhat larger cylindrical recess 14 screw-threaded at 15 at its top mouth. A conductor 16 is electrically connected to socket 10 in any approved manner, and within the socket and insulated therefrom is a metallic ring 17 having a circular inwardly-extended flange 18 perforated or apertured at 19 for the accommodation of a conducting pin 20 and its insulating sleeve or bushing 21. As will be noticed from an inspection of Fig. 2, pin 20 projects outwardly beyond the top face of flange 18 a slight amount for a purpose hereinafter indicated. In the mouth of socket 10 and in engagement with the threads 15 is screwed a bushing 22 which is in electrical contact with the socket 10 but insulated from ring 17. A conducting wire 23 is connected to the pin 20, and to the ring 17 we connect a similar wire 24. An examination of the drawing will show that the internal diameters of bushing 23 and ring 17 are substantially equal and that these two members are in close proximity, being separated by only a thin strip or washer of insulating material.

The removable portion of the thermostat comprises a knurled or milled head or handle 25 reduced in diameter at its lower end and provided at that end with a conical recess or pocket 26 which receives therein the upper correspondingly-shaped portion of a hollow externally screw-threaded shell or casing 27, the threads of which are adapted to co-act with the threads 13 of socket 10. Shell 27 is fastened to the head 25 by means of a screw 28 having a conical head 29 within the interior of shell 27, suitable insulation separating the head and screw from the shell, as is clearly indicated on the drawing. Within the circular undercut recess 30, at the lower end of the shell 28, is placed a thin metallic diaphragm or disk 31 to which is soldered at 35 the lower end of a contact 32 having an enlarged top head 33 and pressed upwardly by an encircling spring 34. To those skilled in this art it will be apparent that the solder 35 maintains the contact 32 in the upright position indicated in Figs. 2 and 4 and out of contact with the conical head 29 of screw 28. When the plug with this internal heat-responsive device is fully screwed into socket 10 the solder 35 is sufficiently near to the bearing 11 to be influenced by the heat thereof, so that an undue heating of the bearing melts the solder and releases the contact which is projected upwardly by its spring 34 and diverted to one side by the conical head 29 so that it forms an electrical connection between the shell or screw-threaded casing 27, the screw 28, and the head or handle 25.

Loosely mounted on the lower portion of head 25 of reduced diameter so as to be capable of a limited reciprocation thereon, we provide a conducting ring 36 which in the normal position of the plug, as shown in Fig. 2, bridges the contacts 17 and 20, closing the circuit including these parts. The external diameter of contact ring 36 is substantially equal to the internal diameter of ring 17 and bushing 22, and in the normal position of the parts this ring is out of contact with bushing 22 by a small amount. As soon as an attempt is made to remove the plug by unscrewing the same from the socket the outer edge of ring 36 will bridge the contacts 17 and 22, thereby closing the electrical connection between wires 16 and 24 which form part of an alarm circuit including a bell and battery. As soon as ring 36 bridges contact 17, 22 the bell is sounded giving instant warning that the thermostat has been tampered with. As an additional safe-guard, the internal diameter of flange 18 of ring 17 is made substantially equal to the external diameter of the screw-threads on shell or casing 27 so that these threads when the plug is partially unscrewed bridge the space between ring 17 and socket 10, closing the circuit between wires 16 and 24. Either the ring 36 or the threads of the casing 27 are sure to close the circuit indicated, so that an alarm is sounded upon but a slight unscrewing of the removable plug.

The test circuit of the system includes the wires 23 and 24, ring 17, and pin 20 so that as soon as the plug is unscrewed sufficiently to raise the ring 36 out of contact with either the pin 20 or ring 17 the test circuit is broken, and a test sent over this circuit will indicate to the operator that the heat-responsive part of the thermostat has been moved from its normal position or that the plug has been wholly or partially removed from the socket 10. Two operations, therefore, are performed by a total or partial unscrewing of the plug, an alarm is rung, and the test circuit is broken.

If the bearing 11 becomes heated while the plug is screwed fully home in its socket, the spring-pressed contact 32 will be released and make an electrical connection between shell 27 and the head of screw 28, thereby closing the electrical circuit between wire 16 and the two wires 23 and 24, either of which will be traversed by the current of electricity if the other happens to be broken. This electrical connection between wire 16 and wire 23 includes socket 10, shell 27, the head 33 of contact 32, screw head 29, screw 28, knob or handle 25, ring 36, and pin 20. The electrical connection between wire 16 and wire 24 includes the parts 10, 27, 33, 29, 28, 25, 36, and 17.

It will be noticed that our improved thermostat includes a spring-actuated heat-released electrical contact, and that in addition it includes the contacts 17 and 20 normally bridged by ring 36 and the contact 22 which is put in electrical connection with ring 17 as soon as the plug is partially unscrewed by the ring 36. Shell 27 also acts as a bridging contact between socket 10 and ring 17 during the removal of the plug.

Although we have indicated to some extent a system in which our improved type of thermostat may be used, since thermostats may be used in a variety of systems we have not deemed it necessary to illustrate the electrical conductors, alarms, etc., but have confined our illustrations and claims to the thermostat itself.

Minor mechanical changes may be made in the structure shown and described without sacrificing the advantages of the particular structure disclosed, as will be obvious to those skilled in the art.

We claim:

1. A thermostat consisting of two parts, one of which is adapted to be applied to the device to be protected and the other of which is readily removable from said first part, a heat-operated circuit-closer mounted on and carried by said removable part, and a contact mounted on and carried by said removable part and adapted to close an electric circuit when said removable part is in proper operative position in the other part of the thermostat, substantially as described.

2. In a two-part thermostat, the combination of one part adapted to be applied to the device to be protected, a second part capable of being applied to and readily removable from said first part, a heat-operated circuit closer on said second part, a contact on said first part, and a second contact on said removable part, said contacts being out of contact when said removable part is applied to said first part with said heat-operated circuit-closer in operative relation with the device to be protected, said contacts being so positioned that they will be brought together on attempted removal of said second part, substantially as described.

3. In a two-part thermostat, the combination of one part adapted to be applied to the device to be protected, a second part capable of being applied to and readily removable from said first part, a heat-operated circuit-closer on said second part, a pair of contacts on said first part, and a coöperating contact on said removable part which conductively bridges said contacts of the other part when said removable portion of the thermostat is applied to its companion part and which ceases to conductively bridge said contacts upon attempted removal of the second part of the thermostat, substantially as described.

4. In a two-part thermostat, the combination of one part adapted to be applied to the device to be protected, a second part capable of being applied to and readily removable from said first part, a heat-operated circuit-closer mounted on and carried by said second part, and means mounted on said second part to close an electric circuit upon attempted removal of said second part from said first part, substantially as described.

5. In a two-part thermostat, the combination of one part adapted to be applied to the device to be protected, a second part capable of being applied to and readily removable from said first part, a heat-operated circuit-closer mounted on and carried by said second part, and means mounted on said second part to open an electric circuit upon attempted removal of said second part from said first part, substantially as described.

WILLIAM F. GOSSICK.
ARTHUR R. VAN VALKENBURGH.

Witnesses:
PATRICK J. McDONAGH,
THOS. P. GREEN.